US012666097B2

(12) United States Patent
Kwak et al.

(10) Patent No.: US 12,666,097 B2
(45) Date of Patent: Jun. 23, 2026

(54) METHOD AND DEVICE FOR SYNCHRONIZATION BETWEEN VIDEO FRAME AND AUDIO FRAME

(71) Applicant: SK Telecom Co., Ltd., Seoul (KR)

(72) Inventors: Kyung Chul Kwak, Seoul (KR); Dai Boong Lee, Seoul (KR); Hyun Chul Joo, Seoul (KR)

(73) Assignee: SK TELECOM CO., LTD., Seoul (KR)

( * ) Notice: Subject to any disclaimer, the term of this patent is extended or adjusted under 35 U.S.C. 154(b) by 0 days.

(21) Appl. No.: 18/891,626

(22) Filed: Sep. 20, 2024

(65) Prior Publication Data

US 2025/0016391 A1      Jan. 9, 2025

Related U.S. Application Data

(63) Continuation of application No. PCT/KR2022/019413, filed on Dec. 1, 2022.

(30) Foreign Application Priority Data

Mar. 22, 2022      (KR) ......................... 10-2022-0035382

(51) Int. Cl.
*H04N 21/242* (2011.01)

(52) U.S. Cl.
CPC .................................. *H04N 21/242* (2013.01)

(58) Field of Classification Search
CPC .. H04N 21/242; H04N 21/232; H04N 21/262; H04N 21/43; H04N 21/43072;

(Continued)

(56) References Cited

U.S. PATENT DOCUMENTS 5,841,771 A * 11/1998 Irwin ................. H04Q 11/0478
                                                370/383
6,357,028 B1 * 3/2002 Zhu .................... H04N 21/6377
                                                714/751

(Continued)

FOREIGN PATENT DOCUMENTS

JP             4481444 B2      3/2010
KR      10-2012-0015037 A      2/2012

(Continued)

OTHER PUBLICATIONS

International Seach Report of PCT/KR2022/019413 mailed on Mar. 24, 2023.

*Primary Examiner* — Michael B. Pierorazio
(74) *Attorney, Agent, or Firm* — Hauptman Ham, LLP

(57) ABSTRACT

The present disclosure provides a method and a device for synchronization between a video frame and an audio frame on the basis of high-speed transmission of a VoD content. A content delivery server includes a transceiver and a processors. The transceiver receives, from a content requesting terminal, a search request for a specific playback time within a VOD content. In response to the search request, the processor deletes one or more audio frames existing between a video frame that corresponds to the requested playback time and an audio frame that corresponds to the requested playback time; and generates content data reconstructed to include all or part of frames existing in a period of time from the video frame that corresponds to the requested playback time to the audio frame that corresponds to the requested playback time. The transceiver transmits the reconstructed content data to the content-requesting terminal.

6 Claims, 5 Drawing Sheets

Video frame at requested playback time      Audio frame at requested playback time

(58) Field of Classification Search
CPC ........... H04N 21/472; H04N 21/26233; H04N 21/47202
See application file for complete search history.

(56)             References Cited

U.S. PATENT DOCUMENTS

| | | | | |
|---|---|---|---|---|
| 6,396,850 | B1 * | 5/2002 | de Vito | H04N 7/1675 348/E7.056 |
| 6,665,345 | B1 * | 12/2003 | Sekiguchi | H04N 19/66 375/E7.279 |
| 6,980,731 | B1 * | 12/2005 | Tahara | H04N 21/43632 386/E9.036 |
| 6,983,323 | B2 * | 1/2006 | Cantrell | H04L 69/22 709/225 |
| 7,617,509 | B1 * | 11/2009 | Brunheroto | H04N 17/004 725/19 |
| 7,760,826 | B2 * | 7/2010 | Chang | H04L 25/03019 375/346 |
| 8,204,362 | B2 * | 6/2012 | Aratani | H04N 19/40 386/232 |
| 8,279,884 | B1 * | 10/2012 | Narasimha | H04L 47/365 370/410 |
| 8,284,259 | B2 * | 10/2012 | Karacali-Akyamac | H04L 43/024 348/180 |
| 8,620,275 | B2 * | 12/2013 | Minear | H04N 21/812 725/62 |
| 9,203,498 | B2 * | 12/2015 | Ohayon | H04L 69/324 |
| 10,735,120 | B1 * | 8/2020 | Kantharaju | H04L 43/087 |
| 2002/0053053 | A1 * | 5/2002 | Nagai | H04L 1/0002 375/E7.016 |
| 2002/0196363 | A1 * | 12/2002 | Furusawa | H04N 21/4344 348/461 |
| 2003/0051254 | A1 * | 3/2003 | Weidenfeller | H04N 21/266 725/98 |
| 2004/0105463 | A1 * | 6/2004 | Cheung | H04L 1/0001 370/468 |
| 2004/0153940 | A1 * | 8/2004 | Yu | H03M 13/2957 714/746 |
| 2005/0100100 | A1 * | 5/2005 | Unger | H04N 21/6373 375/E7.134 |
| 2005/0120124 | A1 * | 6/2005 | Korhonen | H04L 1/007 714/746 |
| 2005/0180415 | A1 * | 8/2005 | Cheung | H04N 21/6437 348/E7.071 |
| 2005/0262529 | A1 * | 11/2005 | Neogi | H04N 21/63345 725/31 |
| 2005/0286431 | A1 | 12/2005 | Saito | |
| 2007/0053303 | A1 * | 3/2007 | Kryuchkov | H04L 43/0852 370/252 |
| 2008/0074542 | A1 * | 3/2008 | Cheng | H04N 19/89 375/E7.278 |
| 2008/0075031 | A1 * | 3/2008 | Ohayon | H04N 21/6143 370/316 |
| 2008/0170630 | A1 * | 7/2008 | Falik | H04N 21/23406 375/E7.193 |
| 2008/0192119 | A1 * | 8/2008 | Li | H04N 21/44209 348/180 |
| 2008/0259962 | A1 * | 10/2008 | Mori | H04N 21/4305 375/E7.278 |
| 2009/0116814 | A1 * | 5/2009 | Morohashi | H04N 5/92 455/556.1 |
| 2009/0158326 | A1 * | 6/2009 | Hunt | H04N 5/783 725/38 |
| 2009/0276821 | A1 * | 11/2009 | Amento | H04N 21/44226 725/116 |
| 2010/0080305 | A1 * | 4/2010 | Guo | H04N 21/4382 375/E7.279 |
| 2010/0091888 | A1 * | 4/2010 | Nemiroff | H04N 19/115 375/E7.154 |
| 2010/0333164 | A1 * | 12/2010 | Schultz | H04N 21/4347 386/E5.028 |
| 2011/0222669 | A1 * | 9/2011 | Buriano | H04L 65/752 379/32.01 |
| 2012/0042091 | A1 * | 2/2012 | McCarthy | H04N 21/812 709/231 |
| 2012/0116758 | A1 * | 5/2012 | Murgia | G10L 19/24 704/226 |
| 2013/0028121 | A1 * | 1/2013 | Rajapakse | H04L 69/163 370/252 |
| 2013/0044803 | A1 * | 2/2013 | Fisher | H04N 21/8455 709/231 |
| 2013/0089140 | A1 * | 4/2013 | Kudana | H04N 19/152 375/240.03 |
| 2013/0340023 | A1 * | 12/2013 | Yoshimoto | H04N 21/6375 725/116 |
| 2014/0013342 | A1 * | 1/2014 | Swan | H04N 21/4821 725/92 |
| 2014/0153909 | A1 | 6/2014 | MacInnis et al. | |
| 2014/0233587 | A1 * | 8/2014 | Liu | H04L 47/826 370/468 |
| 2015/0082366 | A1 * | 3/2015 | French | H04N 21/6371 725/116 |
| 2015/0189394 | A1 * | 7/2015 | French | H04L 65/611 725/109 |
| 2015/0304714 | A1 * | 10/2015 | Park | G11B 27/005 725/88 |
| 2016/0165266 | A1 * | 6/2016 | Bocharnikov | H04N 21/242 725/109 |
| 2016/0261896 | A1 * | 9/2016 | Bocharnikov | H04N 21/23424 |
| 2016/0295254 | A1 * | 10/2016 | Chen | H04N 21/23406 |
| 2017/0111686 | A1 * | 4/2017 | Quere | H04N 21/8547 |
| 2017/0302378 | A1 * | 10/2017 | Mutalik | H04L 12/2856 |
| 2018/0295050 | A1 * | 10/2018 | Lee | H04L 43/04 |
| 2019/0014050 | A1 * | 1/2019 | Wang | H04L 49/9005 |
| 2019/0116057 | A1 * | 4/2019 | Colson | H04L 12/2801 |
| 2019/0207690 | A1 * | 7/2019 | Mäki | H04Q 11/00 |
| 2019/0327499 | A1 * | 10/2019 | Poli | H04N 21/2353 |
| 2020/0371675 | A1 * | 11/2020 | Sung | G06F 3/04883 |
| 2022/0053491 | A1 * | 2/2022 | Sevindik | H04L 27/0002 |

FOREIGN PATENT DOCUMENTS

| | | |
|---|---|---|
| KR | 10-1428472 B1 | 8/2014 |
| KR | 10-2022-0028950 A | 3/2022 |

* cited by examiner

METHOD AND DEVICE FOR SYNCHRONIZATION BETWEEN VIDEO FRAME AND AUDIO FRAME

CROSS-REFERENCE TO RELATED APPLICATIONS

This a bypass continuation of International PCT Application No. PCT/KR2022/019413 filed on Dec. 1, 2022, which claims priority to Republic of Korea Patent Application No. 10-2022-0035382 filed on Mar. 22, 2022, which are incorporated by reference herein in their entirety.

TECHNICAL FIELD

The present disclosure relates to a method and a device for synchronization between video frames and audio frames.

BACKGROUND ART

The content in this section merely provides background information related to the present disclosure and does not constitute the prior art.

As content delivery services evolve, they offer viewers a variety of services, including not only live content delivery services provided by broadcasters, but also video on demand (VOD) services. Unlike over-the-air broadcasting, VoD services may deliver VoD content to users using communication lines such as the Internet. With VOD services, users may watch desired content at a desired time.

A VoD content consists of audio data and video data. The audio data and video data comprise one or more audio frames and video frames, respectively. As used herein, a frame is the minimum unit of video or audio output by a display for the content. A VoD content is played with a plurality of video frames and/or audio frames changing rapidly.

Audio frames are transmitted to a content requesting terminal a preset time later than video frames with the same Presentation Time Stamp (PTS). The PTS is a timestamp that indicates a playback time for synchronization of video and audio. Accordingly, when playing a VoD content starting from a specific playback time within the VoD content, there is a problem that an audio frame before the specific playback time is played, which does not match a video frame of the specific playback time.

Furthermore, when the content requesting terminal plays the VoD content starting from the specific playback time within the VoD content, the content requesting terminal cannot play the VoD content until an audio frame corresponding to the same PTS as a video frame of the specific playback time is transmitted. As a result, there is a problem of a delay before playing the video of the requested playback time.

SUMMARY

According to one embodiment of the present disclosure, the main purpose is to provide a technique for performing synchronization between a video frame and an audio frame corresponding to the same PTS quickly by deleting audio frames corresponding to PTS before a requested playback time when a search request for a specific playback time within a VoD content is received.

According to another embodiment of the present disclosure, the main purpose is to provide a technique for transmitting content data reconstructed by deleting audio frames corresponding to PTS before a requested playback time to a content requesting terminal quickly.

The problems to be solved by the present disclosure are not limited to the aforementioned problems, and other problems not mentioned will become apparent to those of ordinary skill in the art from the following description.

According to one embodiment, the present disclosure provides a content delivery server transmitting a VoD content to a content requesting terminal at high speed including a transceiver; and a processor, wherein the transceiver receives, from a content requesting terminal, a search request for a specific playback time within a VOD content, wherein in response to the search request, the processor deletes one or more audio frames existing between a video frame that corresponds to the requested playback time and an audio frame that corresponds to the requested playback time, wherein the processor generates content data reconstructed to include all or part of frames existing in a period of time from the video frame that corresponds to the requested playback time to the audio frame that corresponds to the requested playback time, and wherein the transceiver transmits the reconstructed content data to the content-requesting terminal.

According to another embodiment, the present disclosure provides a method for synchronization between video frames and audio frames including receiving, from a content requesting terminal, a search request for a specific playback time within a VoD content; deleting one or more audio frames existing between a video frame that corresponds to the requested playback time and an audio frame that corresponds to the requested playback time based on the search request; generating content data reconstructed to include all or part of frames existing in a period of time from the video frame that corresponds to the requested playback time to the audio frame that corresponds to the requested playback time; and transmitting the reconstructed content data to the content requesting terminal.

According to one embodiment of the present disclosure, by performing synchronization between video frames and audio frames, it is possible to resolve inconsistencies between video frames and audio frames, which occur when playing video and audio corresponding to a requested playback time.

According to another embodiment of the present disclosure, by transmitting reconstructed content data to a content requesting terminal quickly, it is possible to reduce a delay time for playing video and audio corresponding to a requested playback time within a VoD content.

The effects of the present disclosure are not limited to those mentioned above, and other effects not mentioned will be clearly understood by those skilled in the art from the following description.

DETAILED DESCRIPTION

Figure 1A:
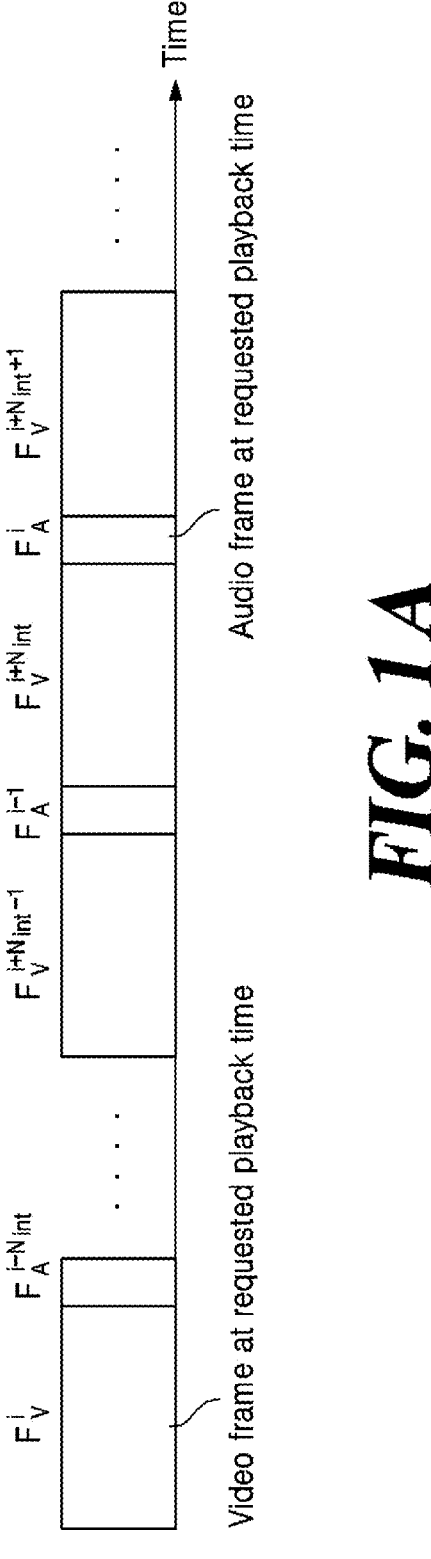
FIG. 1A is a conceptual diagram for illustrating a conventional data structure of a VOD content.

Hereinafter, some embodiments of the present disclosure will be described in detail with reference to the accompanying drawings. In the following description, like reference numerals preferably designate like elements, although the elements are shown in different drawings. Further, for the purpose of clarity and for brevity, the following description of some embodiments will omit a detailed description of related known components and functions when considered obscuring the subject of the present disclosure.

Various ordinal numbers or alpha codes such as first, second, i), ii), a), b), etc., are prefixed solely to differentiate one component from the other but not to imply or suggest the substances, order, or sequence of the components. Throughout this specification, when a part "includes" or "comprises" a component, the part is meant to further include other components, to not exclude thereof unless specifically stated to the contrary.

FIG. 1A is a conceptual diagram for illustrating a conventional data structure of a VOD content.

Referring to FIG. 1A, a VoD content includes all or some of video data and audio data. The video data and audio data comprise one or more video frames and audio frames, respectively. As used herein, a frame is the minimum unit that constitutes video and/or audio of content data. The VoD content may be played as a plurality of video frames and/or audio frames that are output quickly. As used herein, the term "frame" refers to a video frame and/or an audio frame.

Each frame corresponds to a specific playback time. When transmitting frames constituting the VoD content, transmission of an audio frame follows transmission of a video frame, on the basis of the same presentation time stamp (PTS). Here, the PTS refers to a timestamp indicating the playback time for synchronization of video and audio. For example, suppose that VoD content starts to be played from a time corresponding to i-th (i is a natural number) video frame. In this case, after transmission of i-th video frame $$F_V^i \text{ to } i + N_{int}$$

video frame and transmission of an audio frame $$F_A^{i \rightarrow N_{int}}$$

to an audio frame $$F_A^{i-1},$$

i-th audio frame $$F_A^i$$

corresponding to the same PTS as i-th video frame $$F_V^i$$

is transmitted. Accordingly, when the content requesting terminal plays the VoD content starting from the time corresponding to i-th video frame, the i-th video frame cannot be played unless the audio frame corresponding to the same PTS as the i-th video frame is received.

Figure 1B:
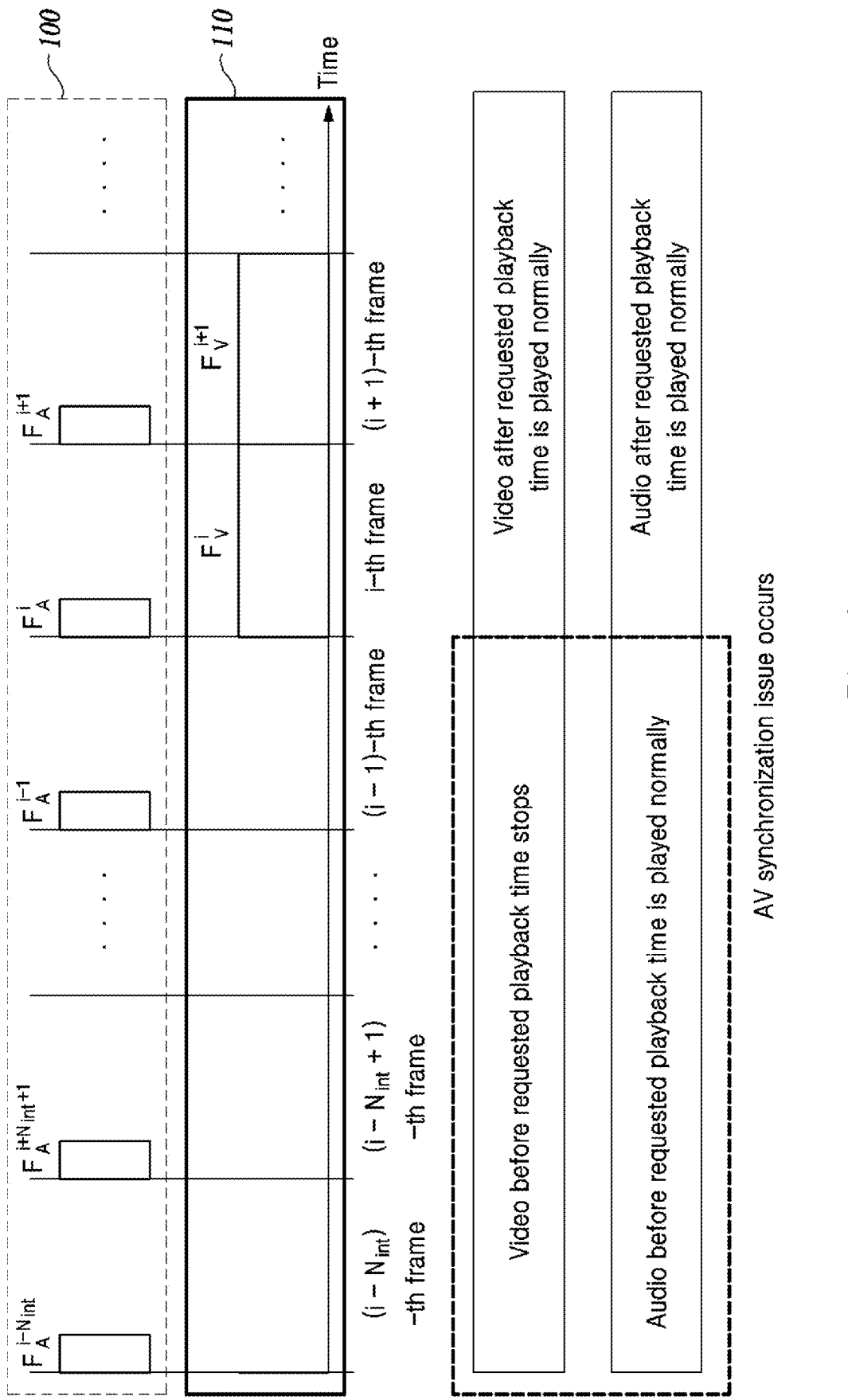
FIG. 1B is a conceptual diagram for illustrating a problem with a conventional data structure of a VoD content by dividing the data structure shown in FIG. 1A into frames with same timestamp.

FIG. 1B is a conceptual diagram for illustrating a problem with a conventional data structure of a VoD content by dividing the data structure shown in FIG. 1A into frames with same timestamp.

Referring to FIG. 1b, the VoD content includes all or some of audio data 100 and video data 110. The audio data 100 and the video data 110 consist of one or more audio frames and one or more video frames, respectively.

When a user wants to start playing the VoD content from a specific playback time within the VoD content, such as a playback time corresponding to the i-th (i is a natural number) frame, the content delivery server may receive a search request for the specific playback time from the content requesting terminal. In this case, video before the i-th frame corresponding to the requested playback time is not played, but audio before the i-th frame is played normally. In other words, there is a problem that the video and audio do not match when playing a VoD content from the playback time of the search request.

In addition, since the i-th audio frame is transmitted only after the audio frames $$F_A^{i \rightarrow N_{int}}$$

to $$F_A^{i-1},$$

there is a delay time until a content corresponding to the requested playback time is played. The delay time for playing the content corresponding to the requested playback time may be calculated using Equation 1.

$$\frac{\sum_{m=0}^{N_{int}} D\left(F_V^{i+m}\right) + D\left(F_A^i\right)}{R_C} \qquad \text{(Equation 1)}$$

Here, D(F) is the data size (in unit of bits) of frame F, and $R_C$ is the constant transmission rate at which the content delivery server transmits data to the content requesting terminal at constant bit rate. The $R_C$ may be set arbitrarily by a configurator, who can set the $R_C$ appropriately to prevent underflow and overflow of a receive buffer in the content requesting terminal. Buffer underflow occurs when a buffer used to transfer data between two devices or processes receives data at a lower rate than it is being read. When the buffer underflow occurs, a program or device reading from the buffer temporarily pauses until the buffer is fed data. The buffer overflows occur when data fed to a buffer is larger than its storage capacity and exceeds the corresponding memory space. When the buffer overflow occurs, the memory space used by the program in the computer system overflows, causing a program execution error.

Figure 2:
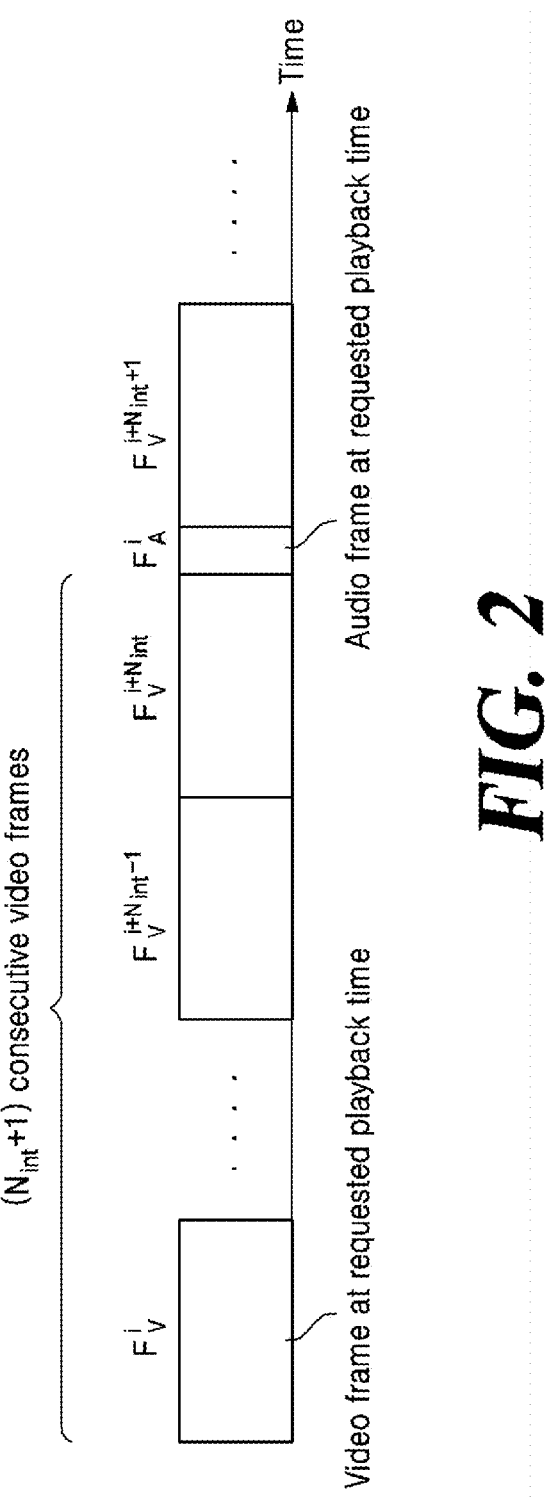
FIG. 2 is a diagram for illustrating a reconstructed data structure of VoD content according to an embodiment of the present disclosure.

FIG. 2 is a diagram for illustrating a reconstructed data structure of VoD content according to an embodiment of the present disclosure.

Referring to FIG. 2, to solve the problem of a conventional VoD content, the content delivery server deletes audio frames $$F_A^{i-N_{int}} \text{ to } F_A^{i-1}$$

existing between a video frame $$F_V^i$$

corresponding to the requested playback time and an audio frame $$F_A^i$$

corresponding to the requested playback time. In this case, the content data is reconstructed so that ($N_{int}$+1) video frames $$F_V^i \text{ to } F_V^{i+N_{int}}$$

are sequentially arranged between the video frame $$F_V^i$$

and the audio frame $$F_A^i$$

corresponding to the requested playback time. This achieves synchronization between the video frames and the audio frames, resolving the synchronization mismatch that occurs when playing the video and audio at a requested playback time within the VoD content.

Meanwhile, the content delivery server may transmit reconstructed content data to a content requesting terminal at high speed. Here, the reconstructed content data includes the video frame $$F_V^i$$

to the video frame $$F_V^{i+N_{int}},$$

and the audio frame $$F_A^i,$$

except for the deleted audio frames. When transmitting the reconstructed content to the content requesting terminal at high speed, a delay time for playing the content corresponding to a requested playback time may be calculated using Equation 2

$$\frac{\sum_{m=0}^{N_{int}} D\left(F_V^{i+m}\right) + D\left(F_A^i\right)}{R_{Fast}} \qquad \text{(Equation 2)}$$

Here, D(F) is the data size (in unit of bits) of frame F, and $R_{Fast}$ is a high-speed transmission rate at which the content delivery server transmits data to the content requesting terminal at high speed. Using the high-speed transmission rate $R_{Fast}$, the delay time may be shortened compared to using the constant transmission rate $R_C$. The shortened delay time may be calculated using Equation 3.

$$\left(\sum_{m=0}^{N_{int}} D\left(F_V^{i+m}\right) + D\left(F_A^i\right)\right) \times \left(\frac{1}{R_C} - \frac{1}{R_{Fast}}\right) \qquad \text{(Equation 3)}$$

Based on the shortened delay time compared to the delay time using the constant transmission rate $R_C$, the content requesting terminal may quickly play the video and/or audio corresponding to the requested playback time.

Figure 3:
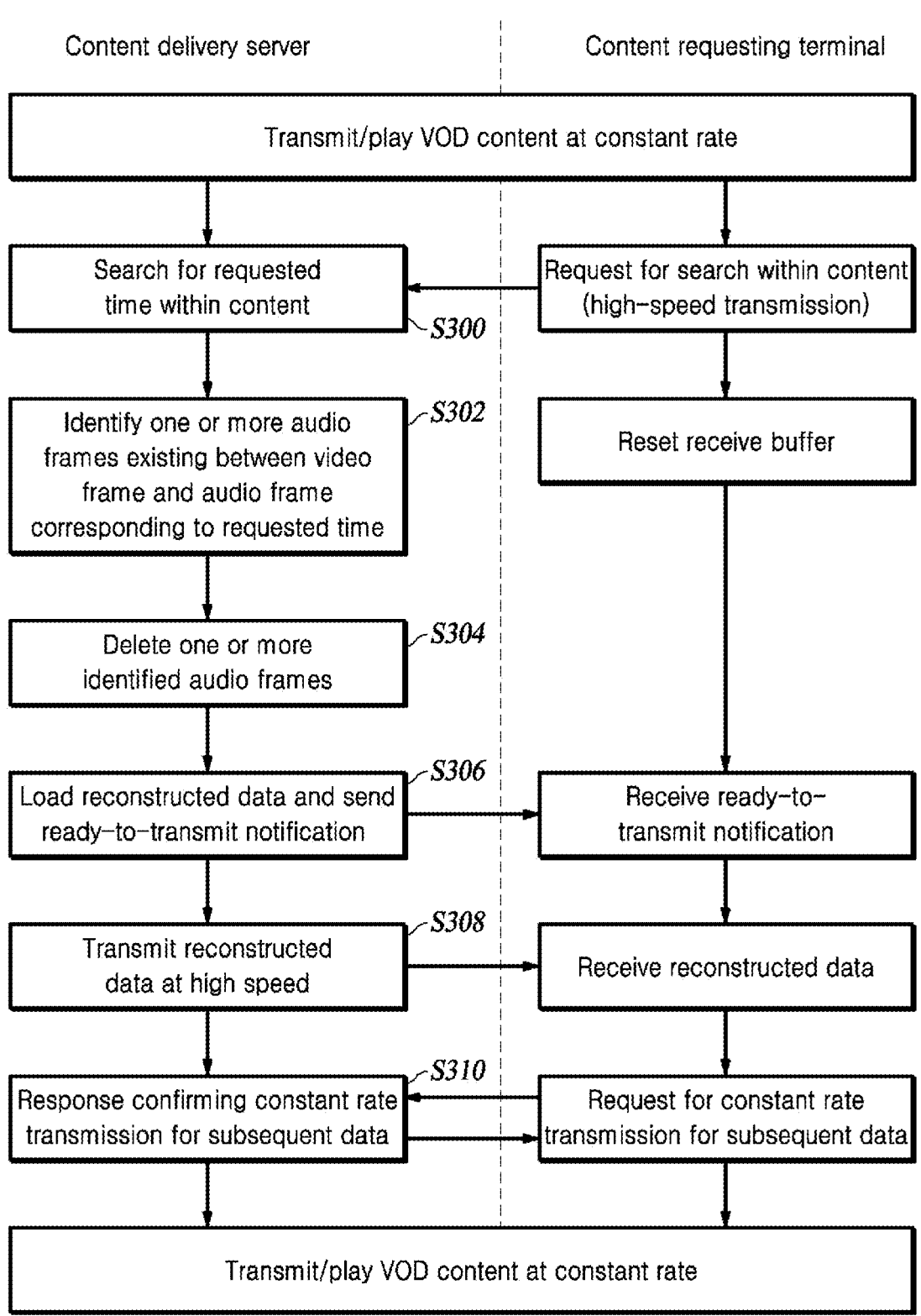
FIG. 3 is a flowchart illustrating a process in which a content delivery server transmits a VoD content to a content requesting terminal according to an embodiment of the present disclosure.

FIG. 3 is a flowchart illustrating a process in which a content delivery server transmits a VoD content to a content requesting terminal according to an embodiment of the present disclosure.

Referring to FIG. 3, the content delivery server receives a search request for a specific playback time within the VoD content from the content requesting terminal (S300). After the content requesting terminal sends the search request to the content delivery server, the content requesting terminal resets a receive buffer. Here, resetting means emptying a storage space of the receive buffer. Since the content requesting terminal receives data at high speed after resetting the receive buffer, buffer underflow and/or overflow does not occur for an initial period of time.

Based on the received search request, the content delivery server identifies one or more audio frames existing between a video frame and an audio frame corresponding to the requested playback time (S302).

The content delivery server deletes one or more audio frames between the video frame and audio frame corresponding to the requested playback time (S304).

The content delivery server generates the content data reconstructed to include all or part of the frames from the video frame corresponding to the requested playback time to the audio frame corresponding to the requested playback time (S306).

The content delivery server transmits the reconstructed content data to the content requesting terminal at high speed. In another embodiment, when the content delivery server sends a ready-to-transmit notification to the content requesting terminal, the content delivery server transmits the reconstructed content data to the content requesting terminal at high speed (S308).

The content delivery server may receive a constant rate transmission request for subsequent video frames and audio frames following the reconstructed content data from the content requesting terminal. When the content delivery server receives the constant rate transmission request from the content requesting terminal, the content delivery server may transmit a response approving the constant rate transmission to the content requesting terminal (S310).

Figure 4:
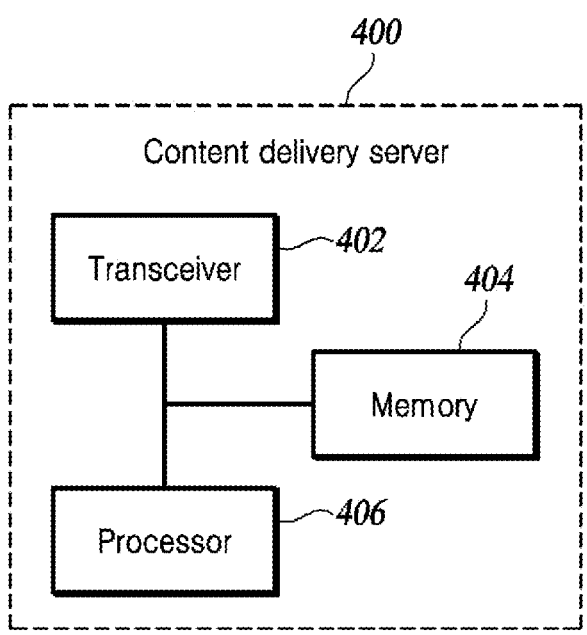
FIG. 4 is a block diagram of a content delivery server according to an embodiment of the present disclosure.

FIG. 4 is a block diagram of a content delivery server according to one embodiment of the present disclosure.

Referring to FIG. 4, the content delivery server 400 includes all or part of a transceiver 402, a memory 404, and a processor 406.

The content delivery server 400 may use the transceiver 402 to communicate with a content requesting terminal. For example, the transceiver 402 may transmit a VoD content to the content requesting terminal and receive a constant rate transmission request from the content requesting terminal.

The memory 404 may store a program that instructs the processor 406 to perform a frame synchronization method according to one embodiment of the present disclosure. For example, the program may include a plurality of instructions executable by the processor 406, and the plurality of instructions may be executed by the processor 406 to perform the frame synchronization method.

The memory 404 may include at least one of volatile memory and non-volatile memory. Volatile memory may include static random access memory (SRAM) or dynamic random access memory (DRAM), and non-volatile memory may include flash memory.

The processor 406 may include at least one component capable of executing at least one instruction. The processor 406 may execute the instructions stored in the memory 404, and perform the frame synchronization method according to the present disclosure by executing the instructions.

Various illustrative implementations of the systems and methods described herein may be realized by digital electronic circuitry, integrated circuits, field-programmable gate arrays (FPGAs), application-specific integrated circuits (ASICs), computer hardware, firmware, software, and/or their combination In the flowcharts of the present specification, it is described that each process is sequentially executed, but this is merely an example of the technical idea of one embodiment of the present disclosure. In other words, those skilled in the art to which one embodiment of the present disclosure belongs can change and execute the order described in the flowchart/timing diagram within the range that does not deviate from the essential characteristics of the embodiment of the present disclosure, or can execute one or more process in parallel to apply various modifications and variations, and thus, the flowchart/timing chart is not limited to a time-series sequence.

The steps described in the flowchart can be implemented as computer-readable code on a computer-readable recording medium. The computer-readable recording medium includes any type of recording device on which data that can be read by a computer system are recordable. Examples of computer-readable recording mediums include non-volatile or non-transitory media such as a ROM, RAM, CD-ROM, magnetic tape, floppy disk, memory card, hard disk, optical/magnetic disk, storage devices, and the like. Further, the computer-readable recording medium can be distributed in computer systems connected via a network, wherein the computer-readable codes can be stored and executed in a distributed mode.

Although exemplary embodiments of the present disclosure have been described for illustrative purposes, those skilled in the art will appreciate that various modifications, additions, and substitutions are possible, without departing from the idea and scope of the claimed invention. Therefore, exemplary embodiments of the present disclosure have been described for the sake of brevity and clarity. The scope of the technical idea of the embodiments of the present disclosure is not limited by the illustrations. Accordingly, one of ordinary skill would understand the scope of the claimed invention is not to be limited by the above explicitly described embodiments but by the claims and equivalents thereof.

DESCRIPTION OF REFERENCE NUMERALS

400: Content delivery server
402: Transceiver
404: Memory
406: Processor

What is claimed is:

1. A content delivery server transmitting a video on demand (VOD) content to a content requesting terminal, the server comprising:
   one or more processors;
   a transceiver configured to:
      receive from a content requesting terminal, a search request for a specific playback time within a VoD content, and
      transmit reconstructed content data corresponding to the search request to the content requesting terminal; and
   memory storing instructions thereon, the instructions when executed by the one or more processors cause the one or more processors to, in response to receiving the search request, delete from the VoD content, one or more audio frames between a video frame that corresponds to the specific playback time and an audio frame that corresponds to the specific playback time to generate the reconstructed content data.

2. The content delivery server of claim 1, wherein the transceiver is configured to, in response to generating the reconstructed content data, transmit a notification indicating that the reconstructed content data is ready for transmission to the content requesting terminal, and wherein the transceiver is further configured to, in response to transmitting the notification transmit the reconstructed content data to the content requesting terminal.

3. A method for synchronization between video frames and audio frames, the method comprising:
   receiving, from a content requesting terminal, a search request for a specific playback time within a video on demand (VOD) content;
   deleting from the VoD content one or more audio frames between a video frame that corresponds to the specific playback time and an audio frame that corresponds to the specific playback time responsive to receiving the search request to generate reconstructed content data; and
   transmitting the reconstructed content data to the content requesting terminal.

4. The method of claim 3, further comprising:
   in response to generating the reconstructed content data, transmitting a notification indicating that the reconstructed content data is ready for transmission to the content requesting terminal; and
   transmitting the reconstructed content data to the content requesting terminal in response to transmitting the notification to the content requesting terminal.

5. A non-transitory computer-readable medium storing computer-readable instructions that, when executed by one or more processors, cause the one or more processors to perform operations, the operations comprising:

receiving, from a content requesting terminal, a search request for a specific playback time within a video on demand (VOD) content;

deleting from the VoD content one or more audio frames between a video frame that corresponds to the specific playback time and an audio frame that corresponds to the specific playback time responsive to receiving the search request to generate reconstructed content data; and transmitting the reconstructed content data to the content requesting terminal.

6. The non-transitory computer-readable medium of claim 5, wherein the operations further comprise;

in response to generating the reconstructed content data, transmitting a notification indicating that the reconstructed content data is ready for transmission to the content requesting terminal; and transmitting the reconstructed content data to the content requesting terminal in response to transmitting the notification to the content requesting terminal.

\* \* \* \* \*